US008781462B2

(12) United States Patent
Osterloh et al.

(10) Patent No.: US 8,781,462 B2
(45) Date of Patent: Jul. 15, 2014

(54) METHODOLOGY AND APPARATUS FOR VALIDATING NETWORK COVERAGE

(75) Inventors: Christopher L. Osterloh, Waseca, MN (US); Matthew Johnson, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 392 days.

(21) Appl. No.: 12/888,752

(22) Filed: Sep. 23, 2010

(65) Prior Publication Data

US 2011/0077037 A1     Mar. 31, 2011

Related U.S. Application Data

(60) Provisional application No. 61/246,205, filed on Sep. 28, 2009.

(51) Int. Cl.
    *H04W 16/00*     (2009.01)
    *H04W 24/06*     (2009.01)
    *H04W 4/02*     (2009.01)

(52) U.S. Cl.
    CPC .............. *H04W 24/06* (2013.01); *H04W 4/02* (2013.01)
    USPC .......... 455/423; 455/67.14; 705/63; 370/248; 370/252; 370/254

(58) Field of Classification Search
    CPC .............................. H04W 16/00; H04W 24/06
    USPC ........... 455/67.14, 423; 705/63; 370/241–253
    See application file for complete search history.

(56) References Cited

U.S. PATENT DOCUMENTS

| 4,132,981 | A | 1/1979 | White |
| 4,190,800 | A | 2/1980 | Kelly, Jr. et al. |
| 4,204,195 | A | 5/1980 | Bogacki |
| 4,254,472 | A | 3/1981 | Juengel et al. |
| 4,322,842 | A | 3/1982 | Martinez |
| 4,396,915 | A | 8/1983 | Farnsworth et al. |
| 4,425,628 | A | 1/1984 | Bedard et al. |
| 4,638,314 | A | 1/1987 | Keller |
| 4,749,992 | A | 6/1988 | Fitzemeyer et al. |
| 5,138,615 | A | 8/1992 | Lamport et al. |
| 5,216,623 | A | 6/1993 | Barrett et al. |
| 5,432,507 | A | 7/1995 | Mussino et al. |

(Continued)

FOREIGN PATENT DOCUMENTS

| JP | 10-070774 | 3/1998 |
| JP | 10/135965 | 5/1998 |

(Continued)

OTHER PUBLICATIONS

Machine translation of abstract of JP 10070774.

(Continued)

*Primary Examiner* — Gennadiy Tsvey
(74) *Attorney, Agent, or Firm* — Dority & Manning, P.A.

(57) ABSTRACT

Disclosed are apparatus and methodology for validating network coverage (i.e., desired functionality) of newly installed network devices. Per use of presently disclosed technology, equipment installers may confirm both one and two way communications abilities of newly installed network devices as well as receive network diagnostic related data to assist them in the equipment installation process. Validation of communications operation may be initiated by any of the newly installed equipment, a handheld device, or via mobile device communications.

21 Claims, 3 Drawing Sheets

(56) References Cited

U.S. PATENT DOCUMENTS

| | | |
|---|---|---|
| 5,459,727 A | 10/1995 | Vannucci |
| 5,515,509 A | 5/1996 | Rom |
| 5,608,780 A | 3/1997 | Gerszberg et al. |
| 5,717,718 A | 2/1998 | Rowsell et al. |
| 5,719,564 A | 2/1998 | Sears |
| 5,727,057 A | 3/1998 | Emery et al. |
| 5,767,790 A | 6/1998 | Jovellana |
| 5,844,893 A | 12/1998 | Gollnick et al. |
| 5,874,903 A | 2/1999 | Shuey et al. |
| 5,880,677 A | 3/1999 | Lestician |
| 5,892,758 A | 4/1999 | Argyroudis |
| 5,894,422 A | 4/1999 | Chasek |
| 5,896,097 A | 4/1999 | Cardozo |
| 5,898,387 A | 4/1999 | Davis et al. |
| 5,898,826 A | 4/1999 | Pierce et al. |
| 5,914,673 A | 6/1999 | Jennings et al. |
| 5,933,092 A | 8/1999 | Ouellette et al. |
| 5,963,146 A | 10/1999 | Johnson et al. |
| 5,963,457 A | 10/1999 | Kanoi et al. |
| 5,987,011 A | 11/1999 | Toh |
| 5,991,806 A | 11/1999 | McHann, Jr. |
| 6,014,089 A | 1/2000 | Tracy et al. |
| 6,044,062 A | 3/2000 | Brownrigg et al. |
| 6,058,355 A | 5/2000 | Ahmed et al. |
| 6,073,169 A | 6/2000 | Shuey et al. |
| 6,075,777 A | 6/2000 | Agrawal et al. |
| 6,078,785 A | 6/2000 | Bush |
| 6,088,659 A | 7/2000 | Kelley et al. |
| 6,097,703 A | 8/2000 | Larsen et al. |
| 6,108,699 A | 8/2000 | Moiin |
| 6,124,806 A | 9/2000 | Cunningham et al. |
| 6,134,587 A | 10/2000 | Okanoue |
| 6,137,423 A | 10/2000 | Glorioso et al. |
| 6,150,955 A | 11/2000 | Tracy et al. |
| 6,172,616 B1 * | 1/2001 | Johnson et al. .......... 340/870.12 |
| 6,195,018 B1 | 2/2001 | Ragle et al. |
| 6,239,722 B1 | 5/2001 | Colten et al. |
| 6,240,080 B1 | 5/2001 | Okaneue et al. |
| 6,246,677 B1 | 6/2001 | Nap et al. |
| 6,246,689 B1 | 6/2001 | Shavitt |
| 6,249,516 B1 | 6/2001 | Brownrigg et al. |
| 6,249,516 C1 | 6/2001 | Brownrigg et al. |
| 6,300,881 B1 | 10/2001 | Yee et al. |
| 6,304,556 B1 | 10/2001 | Haas |
| 6,338,087 B1 | 1/2002 | Okanoue |
| 6,366,217 B1 | 4/2002 | Cunningham et al. |
| 6,400,949 B1 | 6/2002 | Bielefeld et al. |
| 6,407,991 B1 | 6/2002 | Meier |
| 6,415,330 B1 | 7/2002 | Okanoue |
| 6,437,692 B1 | 8/2002 | Petite et al. |
| 6,480,505 B1 | 11/2002 | Johansson et al. |
| 6,535,498 B1 | 3/2003 | Larsson et al. |
| 6,538,577 B1 | 3/2003 | Ehrke et al. |
| 6,553,355 B1 | 4/2003 | Arnoux et al. |
| 6,577,671 B1 | 6/2003 | Vimpari |
| 6,606,708 B1 | 8/2003 | Devine et al. |
| 6,636,894 B1 | 10/2003 | Short et al. |
| 6,653,945 B2 | 11/2003 | Johnson et al. |
| 6,657,552 B2 | 12/2003 | Belski et al. |
| 6,665,620 B1 | 12/2003 | Burns et al. |
| 6,681,110 B1 | 1/2004 | Crookham et al. |
| 6,691,173 B2 | 2/2004 | Morris et al. |
| 6,697,331 B1 | 2/2004 | Riihinen et al. |
| 6,710,721 B1 | 3/2004 | Holowick |
| 6,711,166 B1 | 3/2004 | Amir et al. |
| 6,711,409 B1 | 3/2004 | Zavgren, Jr. et al. |
| 6,714,787 B2 | 3/2004 | Reed et al. |
| 6,718,137 B1 | 4/2004 | Chin |
| 6,725,281 B1 | 4/2004 | Zintel et al. |
| 6,728,514 B2 | 4/2004 | Bandeira et al. |
| 6,751,455 B1 | 6/2004 | Acampora |
| 6,751,672 B1 | 6/2004 | Khalil et al. |
| 6,775,258 B1 | 8/2004 | van Valkenburg et al. |
| 6,778,099 B1 | 8/2004 | Mayer et al. |
| 6,826,620 B1 | 11/2004 | Mawhinney et al. |
| 6,829,216 B1 | 12/2004 | Nakata |
| 6,829,347 B1 | 12/2004 | Odiaka |
| 6,831,921 B2 | 12/2004 | Higgins |
| 6,845,091 B2 | 1/2005 | Ogier et al. |
| 6,865,185 B1 | 3/2005 | Patel et al. |
| 6,885,309 B1 | 4/2005 | Van Heteren |
| 6,891,838 B1 | 5/2005 | Petite et al. |
| 6,900,738 B2 | 5/2005 | Crichlow |
| 6,904,025 B1 | 6/2005 | Madour et al. |
| 6,904,385 B1 | 6/2005 | Budike, Jr. |
| 6,909,705 B1 | 6/2005 | Lee et al. |
| 6,963,285 B2 | 11/2005 | Fischer et al. |
| 6,975,613 B1 | 12/2005 | Johannson |
| 6,980,973 B1 | 12/2005 | Karpenko |
| 6,985,087 B2 | 1/2006 | Soliman |
| 7,006,526 B1 | 2/2006 | Biederman |
| 7,009,379 B2 | 3/2006 | Ramirez |
| 7,009,493 B2 | 3/2006 | Howard et al. |
| 7,016,336 B2 | 3/2006 | Sorensen |
| 7,054,271 B2 | 5/2006 | Brownrigg et al. |
| 7,062,361 B1 | 6/2006 | Lane |
| 7,064,679 B2 | 6/2006 | Ehrke et al. |
| 7,072,945 B1 | 7/2006 | Nieminen et al. |
| 7,102,533 B2 | 9/2006 | Kim |
| 7,103,511 B2 | 9/2006 | Petite |
| 7,106,044 B1 | 9/2006 | Lee, Jr. et al. |
| 7,116,243 B2 | 10/2006 | Schleich et al. |
| 7,126,494 B2 | 10/2006 | Ardalan et al. |
| 7,135,956 B2 | 11/2006 | Bartone et al. |
| 7,136,642 B1 * | 11/2006 | Massie et al. .................. 455/428 |
| 7,143,204 B1 | 11/2006 | Kao et al. |
| 7,145,474 B2 | 12/2006 | Shuey et al. |
| 7,170,425 B2 | 1/2007 | Christopher et al. |
| 7,185,131 B2 | 2/2007 | Leach |
| 7,209,840 B2 | 4/2007 | Petite et al. |
| 7,215,926 B2 | 5/2007 | Corbett et al. |
| 7,230,544 B2 | 6/2007 | Van Heteren |
| 7,250,874 B2 | 7/2007 | Mueller et al. |
| 7,271,735 B2 | 9/2007 | Rogai |
| 7,274,305 B1 | 9/2007 | Luttrell |
| 7,274,975 B2 | 9/2007 | Miller |
| 7,277,027 B2 | 10/2007 | Ehrke et al. |
| 7,283,916 B2 | 10/2007 | Cahill-O'Brien et al. |
| 7,289,887 B2 | 10/2007 | Rodgers |
| 7,298,288 B2 | 11/2007 | Nagy et al. |
| 7,301,476 B2 | 11/2007 | Shuey et al. |
| 7,304,587 B2 | 12/2007 | Boaz |
| 7,308,370 B2 | 12/2007 | Mason, Jr. et al. |
| 7,312,721 B2 | 12/2007 | Mason, Jr. et al. |
| 7,317,404 B2 | 1/2008 | Cumeralto et al. |
| 7,321,316 B2 | 1/2008 | Hancock et al. |
| 7,327,998 B2 | 2/2008 | Kumar et al. |
| 7,343,255 B2 | 3/2008 | Osterloh et al. |
| 7,346,463 B2 | 3/2008 | Petite et al. |
| 7,349,766 B2 | 3/2008 | Rodgers |
| 7,376,118 B2 | 5/2008 | Osterloh et al. |
| 7,379,981 B2 | 5/2008 | Elliott et al. |
| 7,561,062 B2 | 7/2009 | Schleich et al. |
| 7,596,372 B2 * | 9/2009 | Warren ...................... 455/423 |
| 7,746,804 B1 * | 6/2010 | Shurmantine et al. ........ 370/252 |
| 7,830,874 B2 | 11/2010 | Cornwall et al. |
| 7,844,409 B2 | 11/2010 | Johnson et al. |
| 8,164,479 B2 | 4/2012 | Osterloh et al. |
| 8,242,887 B2 | 8/2012 | Cornwall et al. |
| 8,248,267 B2 | 8/2012 | Johnson et al. |
| 8,301,931 B2 | 10/2012 | Johnson |
| 8,310,341 B2 | 11/2012 | Cornwall et al. |
| 2001/0005368 A1 | 6/2001 | Rune |
| 2001/0038342 A1 | 11/2001 | Foote |
| 2001/0046879 A1 | 11/2001 | Schramm et al. |
| 2002/0012358 A1 | 1/2002 | Sato |
| 2002/0110118 A1 | 8/2002 | Foley |
| 2002/0160798 A1 * | 10/2002 | Shoji et al. .................... 455/522 |
| 2002/0184334 A1 | 12/2002 | Cherry et al. |
| 2003/0037268 A1 | 2/2003 | Kistler |
| 2003/0123481 A1 | 7/2003 | Neale et al. |
| 2004/0034773 A1 | 2/2004 | Balabine et al. |
| 2004/0113810 A1 | 6/2004 | Mason, Jr. et al. |
| 2004/0125776 A1 | 7/2004 | Haugli et al. |

(56) References Cited

U.S. PATENT DOCUMENTS

| | | |
|---|---|---|
| 2004/0138787 A1 | 7/2004 | Ransom et al. |
| 2004/0140908 A1 | 7/2004 | Gladwin et al. |
| 2004/0157613 A1 | 8/2004 | Steer et al. |
| 2005/0027859 A1 | 2/2005 | Alvisi et al. |
| 2005/0030968 A1 | 2/2005 | Rich et al. |
| 2005/0035902 A1* | 2/2005 | Eder et al. ............... 342/147 |
| 2005/0055432 A1 | 3/2005 | Rodgers |
| 2005/0058144 A1 | 3/2005 | Ayyagari et al. |
| 2005/0065742 A1 | 3/2005 | Rodgers |
| 2005/0163150 A1* | 7/2005 | Yang et al. ............... 370/445 |
| 2005/0172024 A1 | 8/2005 | Cheifot et al. |
| 2005/0237959 A1 | 10/2005 | Osterloh et al. |
| 2005/0251403 A1 | 11/2005 | Shuey |
| 2006/0056363 A1 | 3/2006 | Ratiu et al. |
| 2006/0056368 A1 | 3/2006 | Ratiu et al. |
| 2006/0056370 A1* | 3/2006 | Hancock et al. ........... 370/338 |
| 2006/0098576 A1 | 5/2006 | Brownrigg et al. |
| 2006/0167784 A1 | 7/2006 | Hoffberg |
| 2006/0184288 A1 | 8/2006 | Rodgers |
| 2006/0215583 A1 | 9/2006 | Castagnoli |
| 2006/0215673 A1 | 9/2006 | Olvera-Hernandez |
| 2006/0217936 A1 | 9/2006 | Mason et al. |
| 2006/0227725 A1* | 10/2006 | Huotari et al. ............ 370/254 |
| 2006/0268807 A1 | 11/2006 | Meier |
| 2006/0271678 A1 | 11/2006 | Jessup et al. |
| 2007/0019598 A1 | 1/2007 | Prehofer |
| 2007/0057767 A1 | 3/2007 | Sun et al. |
| 2007/0063868 A1 | 3/2007 | Borleske |
| 2007/0085700 A1 | 4/2007 | Walters et al. |
| 2007/0087756 A1 | 4/2007 | Hoffberg |
| 2007/0103324 A1 | 5/2007 | Kosuge et al. |
| 2007/0109121 A1 | 5/2007 | Cohen |
| 2007/0136473 A1 | 6/2007 | Birchler et al. |
| 2007/0136817 A1 | 6/2007 | Nguyen |
| 2007/0139220 A1 | 6/2007 | Mirza et al. |
| 2007/0147268 A1 | 6/2007 | Kelley et al. |
| 2007/0183318 A1 | 8/2007 | Johnson et al. |
| 2007/0189249 A1 | 8/2007 | Gurevich et al. |
| 2007/0200729 A1 | 8/2007 | Borleske et al. |
| 2007/0205915 A1 | 9/2007 | Shuey et al. |
| 2007/0206521 A1 | 9/2007 | Osaje |
| 2007/0207811 A1 | 9/2007 | Das et al. |
| 2007/0232321 A1* | 10/2007 | Casati et al. ............ 455/456.1 |
| 2007/0248047 A1 | 10/2007 | Shorty et al. |
| 2007/0258508 A1 | 11/2007 | Werb et al. |
| 2007/0262861 A1* | 11/2007 | Anderson et al. ........ 340/539.13 |
| 2007/0266429 A1 | 11/2007 | Ginter et al. |
| 2007/0271006 A1 | 11/2007 | Golden et al. |
| 2007/0276547 A1 | 11/2007 | Miller |
| 2007/0284293 A1 | 12/2007 | Pitchford et al. |
| 2008/0056261 A1 | 3/2008 | Osborn et al. |
| 2008/0069118 A1* | 3/2008 | Monier ................... 370/400 |
| 2008/0132185 A1 | 6/2008 | Elliott et al. |
| 2008/0177678 A1 | 7/2008 | DiMartini et al. |
| 2009/0135762 A1* | 5/2009 | Veillette ................ 370/328 |
| 2009/0161557 A1* | 6/2009 | Macias .................. 370/242 |
| 2009/0243877 A1 | 10/2009 | Johnson |
| 2010/0026479 A1* | 2/2010 | Tran ..................... 340/501 |
| 2010/0026517 A1 | 2/2010 | Cumeralto et al. |
| 2010/0105425 A1* | 4/2010 | Asokan .................. 455/552.1 |
| 2010/0176967 A1 | 7/2010 | Cumeralto et al. |
| 2010/0188257 A1 | 7/2010 | Johnson |
| 2010/0188258 A1 | 7/2010 | Cornwall et al. |
| 2010/0188263 A1 | 7/2010 | Cornwall et al. |
| 2010/0188938 A1 | 7/2010 | Johnson et al. |
| 2010/0265095 A1 | 10/2010 | Cornwall et al. |
| 2011/0038288 A1 | 2/2011 | Osterloh et al. |
| 2011/0050456 A1 | 3/2011 | Cornwall et al. |
| 2011/0077037 A1 | 3/2011 | Osterloh et al. |
| 2011/0078093 A1 | 3/2011 | Johnson et al. |
| 2011/0255548 A1 | 10/2011 | Johnson |
| 2011/0273305 A1 | 11/2011 | Osterloh et al. |
| 2012/0044087 A1 | 2/2012 | Johnson et al. |
| 2012/0044973 A1 | 2/2012 | Johnson et al. |
| 2012/0176253 A1 | 7/2012 | Osterloh et al. |

FOREIGN PATENT DOCUMENTS

| | | |
|---|---|---|
| WO | WO 00/54237 | 9/2000 |
| WO | WO 01/55865 | 8/2001 |
| WO | WO 2008/027457 | 3/2008 |

OTHER PUBLICATIONS

Machine translation of abstract of JP 10135965.

Johnson, David B., "Routing in Ad Hoc Networks of Mobile Hosts," *IEEE*, pp. 158-163, 1995.

Eng, K.Y. et al., "BAHAMA" A Broadband Ad-Hoc Wireless ATM Local-Area Network, 1995 IEEE International Conference on Communications, ICC '95 Seattle, 'Gateway to Globalization', vol. 2, pp. 1216-1223, Jun. 18-22, 1995.

Katz, Randy H. and Brewer, Eric A., "The Case for Wireless Overlay Networks," *Electrical Engineering and Computer Science Department*, University of California, Berkeley, 12 pages, 1996.

Broch, Josh, et al., "The Dynamic Source Routing Protocol for Mobile Ad Hoc Networks" [online], Mar. 13, 1998 [retrieved on Feb. 24, 2009], 31 pages, Retrieved from the Internet: http://tools.jetf.org/draft-jetf-manet-dsr-00.txt.

Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pages, Oct. 25-30, 1998.

Broch, J. et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.

Lee, David J.Y., "Ricocheting Bluetooth," 2nd International Conference on Microwave and Millimeter Wave Technology Proceedings, ICMMT 2000, pp. 432-435, 2000.

Lilja, Tore, "Mobile Energy Supervision," Twenty-second International Telecommunications Energy Conference, 2000 INTELEC, pp. 707-712, 2000.

Parkka, Juha, et al., "A Wireless Wellness Monitor for Personal Weight Management," Proceedings of the 2000 IEEE EMBS International Conference on Information Technology Applications in Biomedicine, pp. 83-88, 2000.

Hubaux, J.P. et al. "Towards Mobile Ad-Hoc WANs: Terminodes," 2000 IEEE, Wireless Communications and Networking Conference, WCNC, vol. 3, pp. 1052-1059, 2000.

Miklos, G. et al., "Performance Aspects of Bluetooth Scatternet Formation," First Annual Workshop on Mobile and Ad Hoc Networking and Computing, MobiHOC 2000, pp. 147-148, 2000.

Jonsson, U. et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.

Privat, G., "A System-Architecture Viewpoint on Smart Networked Devices," Microelectronic Engineering, vol. 54, Nos. 1-2, pp. 193-197, Dec. 2000.

Kapoor, R et al., "Multimedia Support Over Bluetooth Piconets," First Workshop on wireless Mobile Internet, pp. 50-55, Jul. 2001.

Sung-Yuan, K., "The Embedded Bluetooth CCD Camera," TENCON, proceedings of the IEEE Region 10 International Conference on Electrical and Electronic Technology, vol. 1, pp. 81-84 (5 pp. with Abstract), Aug. 19-22, 2001.

Lim, A., "Distributed Services for Information Dissemination in Self-Organizing Sensor Networks," Journal of the Franklin Institute, vol. 338, No. 6, pp. 707-727, Sep. 2001.

Meguerdichian, S. et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.

Lilakiatsakun, W. et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.

(56) References Cited

OTHER PUBLICATIONS

Jha, s. et al., "Universal Network of Small Wireless Operators (UNSWo)," Proceedings of the First IEEE/ACM International Symposium on Cluster Computing and the Grid, pp. 626-631 (7 pp. with Abstract), 2001.

"AMRON Technologies Successfully Deploys Advanced Metering Solution for C&I Customers Using Bluetooth" [online], Sep. 2, 2004 [retrieved on Jan. 2, 2009], 3 pages, Retrieved from the Internet: http://www.techweb.com/showpressrelease?articleID=X234101 &CompanyID=3.

Hydro One Networks, Inc., Request for Proposal for Smart Metering Services, Mar. 4, 2005, 16 pages.

Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pages.

"AMRON Meter Management System" [online], [retrieved on May 12, 2005], 41 pages, Retrieved from the Internet: http://www.amronm5.com/products/.

Reexamination Application No. 90/008,011 filed Jul. 24, 2006, 75 pages.

Trilliant Networks, "The Trilliant AMI Solution," RFP SCP-07003, Mar. 22, 2007, 50 pages.

"ZigBee Smart Energy Profile Specification," ZigBee Profile 0x0109, Revision 14, Document 075356r14, May 29, 2008, 202 pages.

International Search Report and Written Opinion for PCT Application No. PCT/US08/13016, dated Jan. 9, 2009.
International Search Report and Written Opinion for PCT Application No. PCT/US08/13030, dated Jan. 9, 2009.
International Search Report and Written Opinion for PCT Application No. PCT/US08/13020, dated Jan. 9, 2009.
International Search Report and Written Opinion for PCT Application No. PCT/US08/13023 dated Jan. 12, 2009.
International Search Report and Written Opinion for PCT Application No. PCT/US08/13019, dated Jan. 12, 2009.
International Search Report and Written Opinion for PCT Application No. PCT/US08/13024, dated Jan. 13, 2009.
International Search Report and Written Opinion for PCT Application No. PCT/US08/13025, dated Jan. 13, 2009.
International Search Report and Written Opinion for PCT Application No. PCT/US08/13021, dated Jan. 15, 2009.
International Search Report and Written Opinion for PCT Application No. PCT/US08/13028, dated Jan. 15, 2009.
International Search Report and Written Opinion for PCT Application No. PCT/US08/13022, dated Jan. 27, 2009.
International Search Report and Written Opinion for PCT Application No. PCT/US08/13018, dated Jan. 30, 2009.
International Search Report and Written Opinion for PCT Application No. PCT/US08/13027, dated Feb. 9, 2009.

* cited by examiner

METHODOLOGY AND APPARATUS FOR VALIDATING NETWORK COVERAGE

PRIORITY CLAIM

This application claims the benefit of previously filed U.S. Provisional Patent Application entitled "NETWORK COVERAGE VERIFICATION SYSTEM AND TOOLS," assigned U.S. Ser. No. 61/246,205, filed Sep. 28, 2009, and which is incorporated herein by reference for all purposes.

FIELD OF THE INVENTION

The present technology relates to network communications. More particularly, the present technology relates to apparatus and methodologies for confirming communicational operation of an installed network device vis-à-vis such network at the time of installation of such device.

BACKGROUND OF THE INVENTION

Typically, the installation of new devices within a network has previously relied on either, or a combination of, pre-install propagation modeling and post install review of system performance data, sometimes hours, days, or even weeks after the installer has left the area. While both of such techniques and combinations thereof are useful in their own right and do provide value, they do not provide the real time definitive feedback desired by install crews to fix issues while on-site, in order to thereby avoid costly return visits.

While various methodologies have been developed for the installation of network enabled devices, no design has emerged that generally encompasses all of the desired characteristics as hereafter presented in accordance with the subject technology.

SUMMARY OF THE INVENTION

In view of the recognized features encountered in the prior art and addressed by the present subject matter, improved apparatus and methodologies for validating network coverage of newly installed network end devices have been provided.

In an exemplary configuration, communicative operability of a newly installed end device may be confirmed as between a network reading device while installers are still on site performing such installation efforts.

In one of their simpler forms, an end device initiates a request to a network reading device and quickly receives a validation response.

Another positive aspect of the presently disclosed type of device is that, in addition to a validating response, other data may be returned to the end device to assist the installer during the installation process.

In accordance with aspects of certain embodiments of the present subject matter, methodologies are provided to validate network coverage for a newly installed end device while otherwise insuring minimal impact on normal network operations.

In accordance with still other aspects of other embodiments of the present subject matter, methodologies have been developed to ensure establishment of a robust network link for newly installed end devices while requiring minimal user interaction.

In accordance with yet additional aspects of further embodiments of the present subject matter, apparatus and accompanying methodologies have been developed to analyze end device data to assist in refining pre-planned coverage analyses.

According to yet still other aspects of additional embodiments of the present subject matter, apparatus and methodologies have been developed to continually examine communication coverage.

One exemplary embodiment of the present subject matter relates to a network coverage validation apparatus for validating wireless communication operability for a network of RF transceivers, comprising a testing device for initiating transmission of a validation message intended for in-range transceivers of such network of RF transceivers, and for listening for any reply messages from such RF transceivers.

In some variations of the foregoing apparatus, the RF transceivers may comprise a plurality of cell control units and repeaters, each of which has RF transceiver functionality, with such repeaters providing communications between selected of such cell control units, and with such cell control units providing communications with a plurality of data generating endpoints associated therewith. In still further alternatives of the foregoing, such reply messages may comprise a randomly timed transmission which includes data identifying the transmitting RF transceiver and indicating the relative strength of the signal of the validation message received by such RF transceiver. Still further, such exemplary testing device may include GPS functionality for logging the location of such testing device upon receipt of any reply messages from such network of RF transceivers.

In yet other present alternatives, such testing device may initiate such validation message transmission at periodic intervals while such testing device is continuously relocated relative to such network, for mapping the wireless communication operability for such network.

In other present alternative embodiments of the foregoing apparatus, such reply messages may comprise a randomly timed transmission which may include data identifying the transmitting RF transceiver and indicating the relative strength of the signal of the validation message received by such RF transceiver. Further, such testing device may include GPS functionality for logging the location of such testing device upon receipt of any reply messages from such network of RF transceivers, and means for correlating reply messages and logged locations, for mapping the wireless communication operability for such network.

Another present exemplary embodiment of the present subject matter relates to a network coverage verification tool for confirming RF communication operability for a data endpoint intended for RF association with a network of RF transceivers, comprising an installation testing device for initiating transmission of a validation message from an endpoint to be validated, and for listening for any reply message data originating from such network of RF transceivers.

In some present alternatives, such tool may further include means for displaying the results of any reply message data received by such installation testing device. In other alternatives, such installation testing device may comprise a mobile, handheld device field-usable by an installer for real time checking of communication operability of an installed endpoint. Further, such installation testing device may include means for placing such endpoint to be validated, after transmission of such validation message, into a receive and retransmit mode for receiving reply messages originating from such network of RF transceivers and for forwarding reply message data to such testing device.

In yet other present alternative tool embodiments, such reply message data may include data identifying the transmitting RF transceiver and indicating the relative strength of the signal of the validation message received by such RF transceiver. Further, in some embodiments, such validation message transmission may be initiated a plurality of times at intervals, and such RF transceivers may transmit reply messages on randomly selected communications channels. In some present alternatives, such validation message may include data for requesting response from any receiving RF transceiver of such network, and such RF transceivers may transmit reply messages at randomly selected times after a predetermined minimum amount of delay after receipt of a validation message.

In other present alternative embodiments, such exemplary installation testing device may include means for directly receiving reply messages originating from such network of RF transceivers.

It should be fully understood by those of ordinary skill in the art from the complete disclosure herewith that the present subject matter equally relates to both apparatus and corresponding and/or related methodology. One present exemplary embodiment relates to methodology for validating wireless communication operability for a data collection network of the type comprising a plurality of data endpoints intended for RF association with a network of RF transceivers, such methodology comprising initiating transmission of a validation message intended for in-range transceivers of such network of RF transceivers; and listening for any reply messages originating from such RF transceivers.

In some present alternatives, such initiating may include initiating transmission of a validation message from one of an endpoint to be validated and a mobile device provided for transmission of validation messages; and such listening may include listening for any reply message data originating from such network of RF transceivers. In other present variations, such listening may alternatively include receiving any reply messages one of directly from such RF transceivers, and indirectly from a data endpoint having received such reply messages directly from such RF transceivers and retransmitting same.

Yet in other present alternative methodology embodiments, such RF transceivers may comprise a plurality of cell control units and repeaters, each of which has RF transceiver functionality; such initiating may include initiating transmission of a validation message from a mobile device provided for transmission of validation messages; such reply messages may comprise a randomly timed transmission which may include data identifying the transmitting RF transceiver and indicating the relative strength of the signal of the validation message received by such RF transceiver; and such methodology may further include using GPS functionality and logging the location of such mobile device upon receipt of any reply messages thereat from such network of RF transceivers while moving such mobile device around in such network, and correlating such reply messages and logged locations. Such arrangement contributes to advantageously mapping the wireless communication operability for such network.

In other present alternatives, present methodologies may further include displaying the results of listening for any reply messages.

Still others may further include using a mobile, handheld device field-usable by an installer for such initiating step, for real time checking of communication operability of an installed endpoint. Other present alternative methodology may further include initiating such validation message transmission a plurality of times at intervals; and wherein such RF transceivers transmit reply messages on randomly selected communications channels. Per still other alternatives, such validation message may include data for requesting response from any receiving RF transceiver of such network; and such RF transceivers may transmit reply messages at randomly selected times after a predetermined minimum amount of delay after receipt of a validation message.

Other alternative present methodologies may further include newly installing a data endpoint for RF association with an existing network of RF transceivers; and validating wireless communication operability for such newly installed data endpoint. Such validating preferably may include transmitting a validation message from such newly installed data endpoint, listening with such newly installed data endpoint for any reply messages from such RF transceivers, retransmitting reply message related data from such newly installed data endpoint to a receiver, and assessing such retransmitted reply message related data in order to validate wireless communication operability for such newly installed data endpoint.

Yet other alternative embodiments of present methodology may include such reply messages including data identifying the transmitting RF transceiver and indicating the relative strength of the signal of the validation message received by such RF transceiver; and assessing reply message data to respectively determine the quality of wire communication operability coverage at the locations of selected of such plurality of data endpoints.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the present subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figure 1:
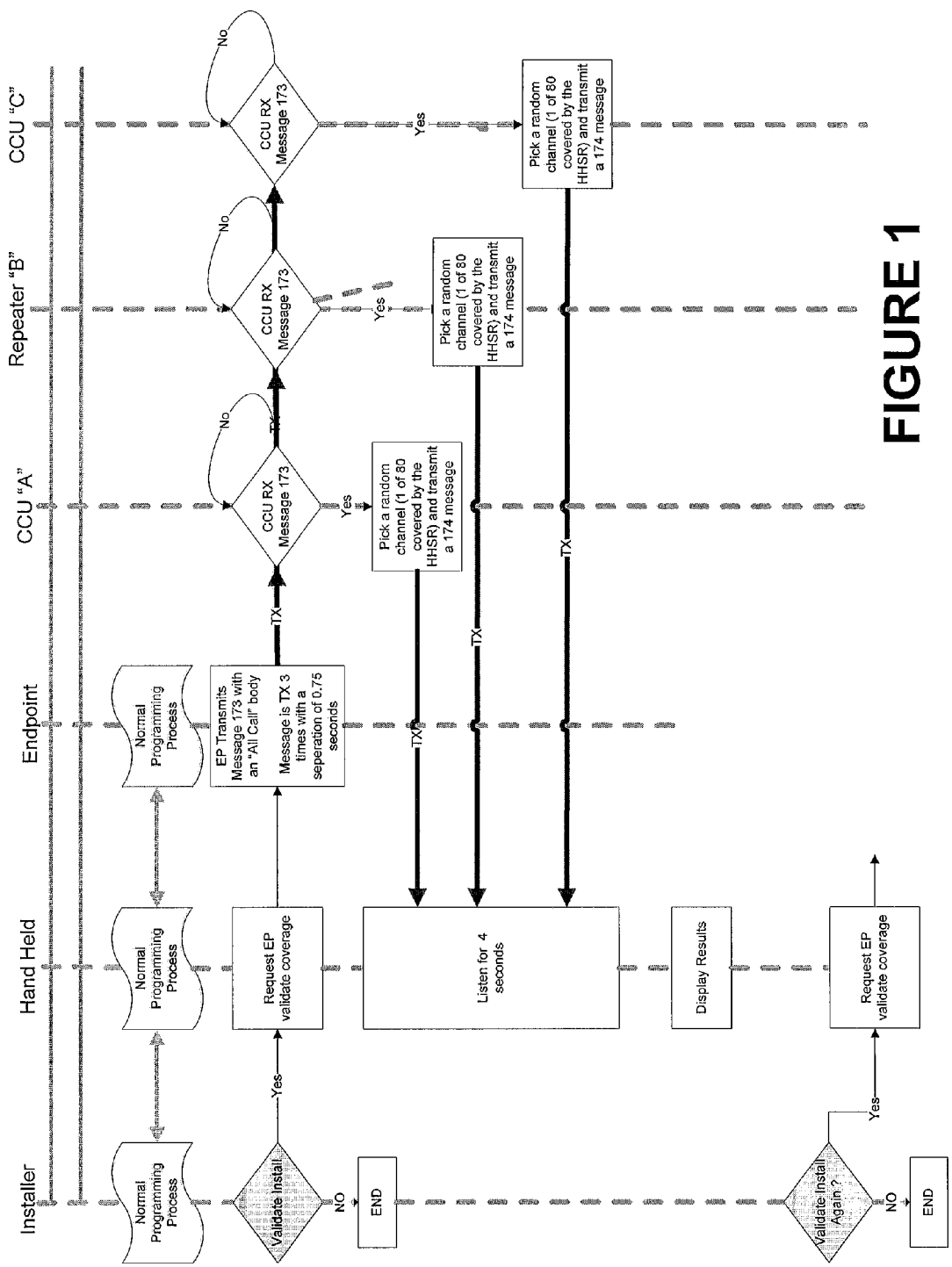
FIG. 1 is a form of flow chart illustration of a first embodiment of an end device installation tool, in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved apparatus and methodologies for validating network coverage of installed network end devices. In accordance with present technology, equipment installers are able to ascertain whether an installed endpoint can successfully communicate with a network both uni-directionally and bi-directionally, i.e., both one way and two way, prior to departing the install site. Ascertainment of such operational certainty not only reduces costs by avoiding follow up visits to the site but also engenders improved customer perception of system capabilities, as well as timely implementation of actual system performance.

It should be appreciated that while the present technology is primarily presently described herein as used in conjunction with initial installation of devices, the present technology may also be applied to previously installed devices as, for example, a check validation of their continued network communication capabilities.

Selected combinations of aspects of the disclosed technology correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features or steps not expressly mentioned which perform the same or similar function.

At the highest level of abstraction, the primary reading technology—exemplary cell control units (CCU's) and repeaters within an automatic meter reading (AMR) network—must respond to end device requests for validation of coverage. Cell Control Units (CCU's) correspond to neighborhood concentrators devices within a radio-based fixed network system that collect meter reading information, provide advanced metering functions, and send metering data to the host processor via a wide area communications network ("WAN"). It should be appreciated by those of ordinary skill in the art that while the present description relates more to radio-based fixed networks, such is not a specific limitation of the present subject matter as similar/equivalent methodologies may be used with equal efficacy in wired networks.

Regardless of the type of network employed, validation of coverage for a newly installed end device per the present subject matter must be done quickly and with a minimal impact on normal operations and channel capacity. As such, the validation process should preferably not take more than a minute of the installer's time and should have no impact to other parts of normal system operation. Such validation must also attempt to take into account differences in end device RF performance, if a device, e.g., a hand held (HH) device, other than the actual endpoint is used for all or part of the validation process.

Figure 2:
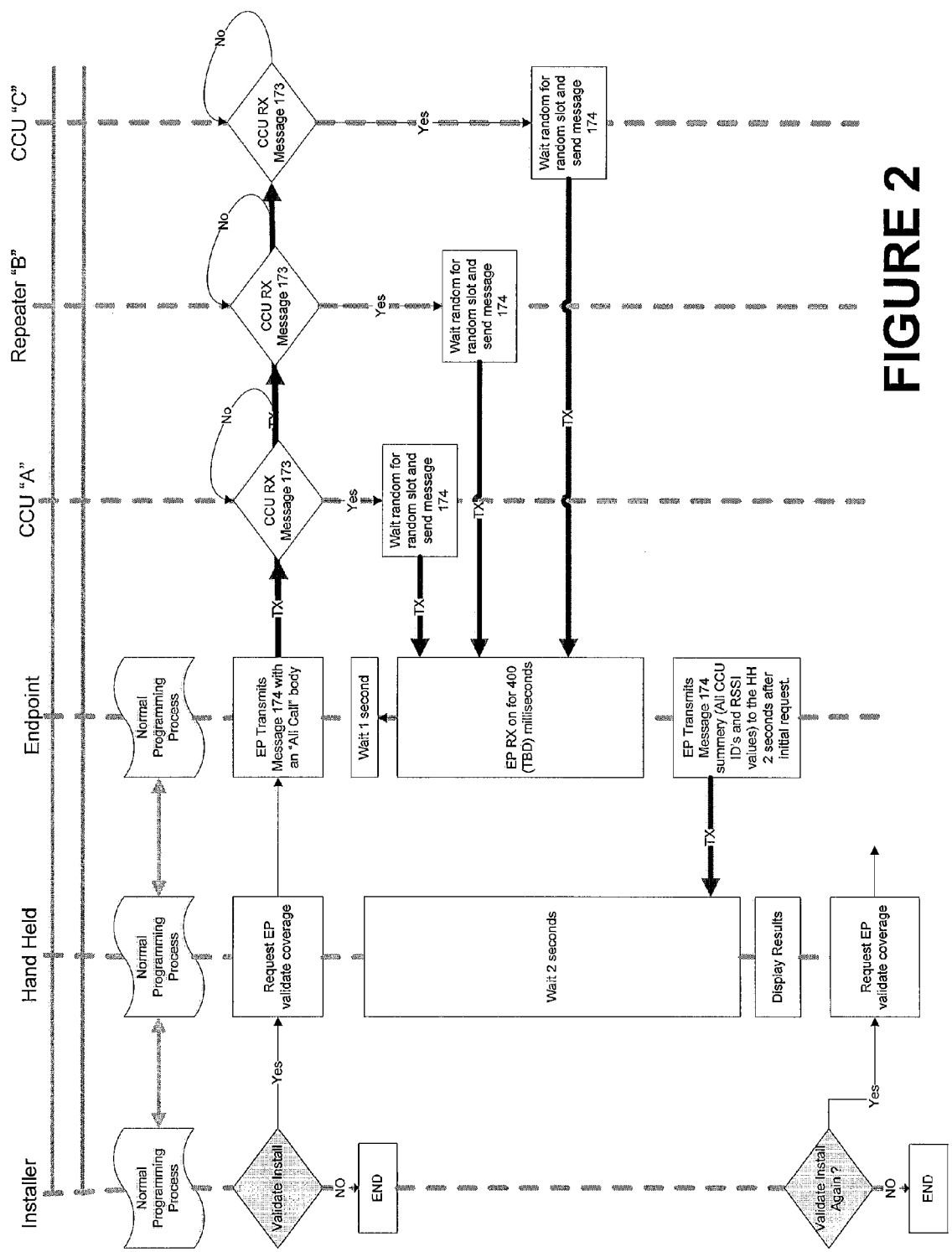
FIG. 2 is a form of a flow chart of an alternative configuration of an end device installation tool in accordance with the present subject matter, that encloses the end device in both sides of a link.

Reference will now be made in detail to the presently preferred embodiments of the subject network coverage verification system and tools. Referring now to the drawings, FIG. 1 illustrates a self-explanatory/labeled form of flow chart illustration of an exemplary first embodiment of an end device installation tool while FIG. 2 illustrates (in self-explanatory/labeled form) an exemplary alternative configuration of an end device installation tool that encloses the end device in both sides of a link. As shown in all of the figures, there are a variety/plurality of devices that are actuated in parallel and generally along a time axis. The plural parallel events are illustrated for each respective device or station in Y-axis arrangement, spaced in parallel from one another along an X-axis arrangement. As will be understood by those of ordinary skill in the art, a time axis is generally represented along the Y-axis direction in such figures, with the initial or "zero" time at the top of the indicated Y-axis and with time progressing (i.e., advancing) as one looks or moves down the respective Y-axes in parallel. Stated another way, time starts near the top of each of the figures and progresses as one moves down toward the bottom of each of the figures, along the respective Y-axes.

As represented, and as will be understood by those of ordinary skill in the art considering both the present specification and attached figures, the basic flow is that an end device initiated request (either HH or endpoint) is sent up to the reading technology (either CCU or repeater), and then returned in a relatively very short time interval where the maximum response time is known. The data returned allows not only validation of the link, i.e., a Go-No Go response, but also in certain embodiments has the ability to carry additional diagnostic information that may be of use to the installer. Such additional or other diagnostic data may include, but is not limited to, received signal strength indicator (RSSI) of the end device to reader link, the number of readers that heard the device, the reader type, and the RSSI of the reader to end device link.

As will be understood by those of ordinary skill in the art from the complete disclosure herewith, including the features illustrated and represented in the subject drawings, a given endpoint, under direction of an installation testing device or handheld device or equivalent, may be placed into a receive and retransmit mode (particularly as represented in present FIG. 2). Preferably, after transmission of a validation message, such given endpoint is in a receive and retransmit mode fore receiving reply messages originating from the network of RF transceivers and for forwarding reply message data to such testing device or handheld device, or equivalent. Those of ordinary skill in the art will understand various ways of accomplishing such functionality, all of which comprise means for such functionality in accordance with the present disclosure.

Communications are designed such that minimal user (i.e., installer) interaction is required but a robust link is nonetheless established. Per the present subject matter, this helps to ensure that transient anomalies in the channel are not mistaken for long term channel impairments. To such end, multiple transmissions (randomized over time and/or frequency) are provided for both sides of the link, i.e., to and from the end device.

A present subject end device may also apply business logic to data received from one or more readers to determine the quality of the coverage at a given location. For example, an inquiry may be made based on available data to determine whether a dual coverage requirement is met for a certain percentage (x %) of the endpoint population. Per present subject matter, such same business logic may include offsets to the received data to compensate for any differences in RF characteristics seen across multiple device families.

Per the present subject matter, data from the end devices may be respectively combined with GPS data and logged for future analyses, both from a customer compliance point of view, and to continually refine propagation models so that pre-planned coverage analyses can continually be made more accurate. Thought of in other terms, such data combination steps may comprise in some embodiments means for correlating reply messages and logged locations, for mapping the wireless communication operability for such network.

Figure 3:
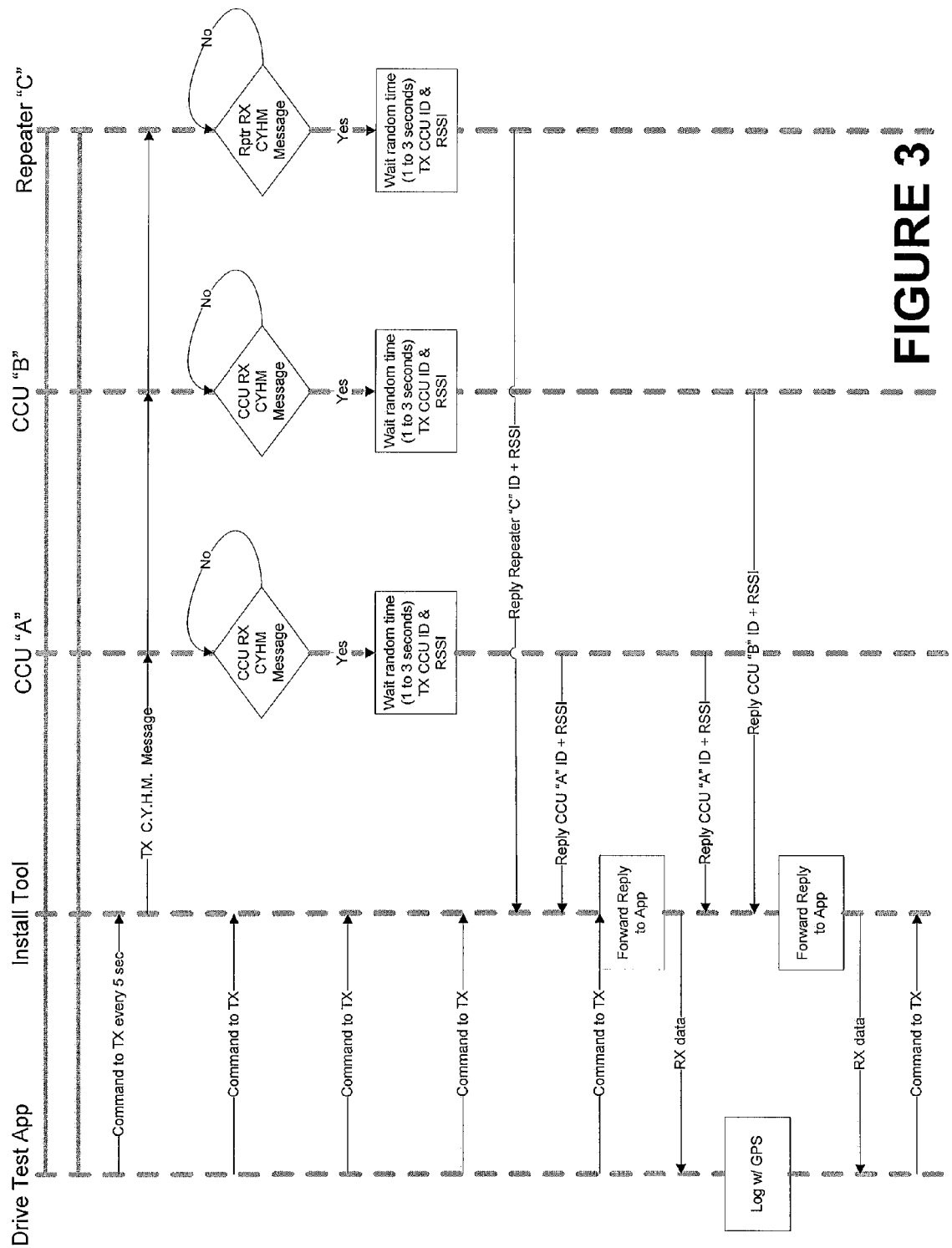
FIG. 3 is a form of a flow chart of a further alternate configuration of an end device installation tool in accordance with the present subject matter, in a mobile configuration.

With reference now to FIG. 3, there is illustrated another self-explanatory, labeled form of a flow chart of a further alternative configuration of the present technology incorporating an end device installation tool in a mobile configuration. By extending the present technology to a mobile drive test scenario, individual end device requests may be replaced by a single mobile device that continually pings all receivers in the area with a "can you hear me" type message, to produce a relatively truer picture of coverage over a wide area.

In accordance with such present subject matter alternative configuration, the network operating software places the CCU into a mode where it transmits its ID periodically via a normal scheduling process (as will be understood by those of ordinary skill in the art without requiring additional detailed discussion of such aspects). During such time, the CCU would transmit out its serial number a predetermined number of times in a row, each preceded by a preamble. In an exemplary present configuration, such predetermined number of serial transmissions may, for example, be three in number. Other numbers may be practiced per present subject matter, as well as different times from example times herein. Such process may be repeated periodically, for example, approximately every 15 seconds. A radio receiver and display package may be provided to receive the ID key messages and to display the number and quality of CCU transmissions heard. Where such radio receiver or its equivalent is associated with a handheld device (as represented in present FIGS. 1 and 3), such handheld device (or installation testing device) may be thought of, in pertinent part, as including means for directly receiving reply messages originating from the network of RF transceivers (such as a CCU and/or repeater).

Such herein referenced display package may comprise any now known or later developed device, such as a screen or print out, and thereby constitute display means for displaying the results of any reply message data received by a present installation testing device, or equivalent functionality. Such present features equally relate to the "Display Results" portion of the present technology as represented in both present FIGS. 1 and 2. It is to be equally understood as usable in conjunction with an embodiment based on present FIG. 3.

Such presently disclosed arrangements would allow an installer to validate coverage before leaving the install site. As will be understood by those of ordinary skill in the art from the discussion herein, normal data reading could still occur between transmissions and during non work hours even during the install process.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure is not intended to preclude inclusion of such modifications, variations and/or additions to the present subject matter as would be readily apparent to one of ordinary skill in the art.

What is claimed is:

1. A network coverage validation apparatus for validating wireless communication operability for a network of RF transceivers, comprising a testing device for initiating transmission of a validation message from a data endpoint intended for RF association with said network of RF transceivers, and for directly receiving at said testing device any reply messages from said RF transceivers, said reply messages including reply message data and originating from such RF transceivers in response to said validation message transmitted by said data endpoint intended for RF association, wherein said testing device offsets received data included in said reply messages based on a difference in RF performance between said testing device and a data endpoint intended for RF association with said network of RF transceivers.

2. An apparatus as in claim 1, wherein said RF transceivers comprise a plurality of cell control units and repeaters, each of which has RF transceiver functionality, with said repeaters providing communications between selected of said cell control units, and with said cell control units providing communications with a plurality of data generating endpoints associated therewith.

3. An apparatus as in claim 2, wherein said reply messages comprise a randomly timed transmission which includes data identifying the transmitting RF transceiver and indicating the relative strength of the signal of the validation message received by such RF transceiver, said testing device offsetting said data indicating the relative strength of the signal of the validation based on said difference in RE performance between said testing device and said data endpoint intended for RF associated with said network of RE transceivers.

4. An apparatus as in claim 3, wherein said testing device includes GPS functionality for logging the location of said testing device upon receipt of any reply messages from said network of RF transceivers.

5. An apparatus as in claim 4, wherein said testing device initiates said validation message transmission at periodic intervals while said testing device is continuously relocated relative to said network, for mapping the wireless communication operability for such network.

6. A network coverage verification tool for confirming RF communication operability for a data endpoint intended for RF association with a network of RF transceivers comprising a plurality of RF transceivers,
    comprising an installation testing device for initiating transmission of a validation message from said endpoint to be validated for RF association with said network of RF transceivers, wherein said installation testing device is configured for receiving RF transmissions comprising direct receipt of reply message data as directly originated from said plurality of RF transceivers in response to said validation message from said endpoint to be validated.

7. A network coverage verification tool as in claim 6, wherein said installation testing device comprises a mobile, handheld device field-usable by an installer for real time checking of communication operability of an installed endpoint.

8. A network coverage verification tool as in claim 6, wherein said installation testing device includes means for placing such endpoint to be validated, after transmission of said validation message, into a receive and retransmit mode for receiving reply messages originating from said network of RF transceivers and for forwarding reply message data to said testing device.

9. A network coverage verification tool as in claim 6, wherein said reply message data includes data identifying the transmitting RF transceiver and indicating the relative strength of the signal of the validation message received by such RE transceiver.

10. A network coverage verification tool as in claim 6, wherein said validation message transmission is initiated a plurality of times at intervals, and said RF transceivers transmit reply messages on randomly selected communications channels.

11. A network coverage verification tool as in claim 6, wherein said validation message includes data for requesting response from any receiving RF transceiver of said network, and said RE transceivers transmit reply messages at randomly selected times after a predetermined minimum amount of delay after receipt of a validation message.

12. Methodology for validating wireless communication operability for a data collection network of the type comprising a plurality of data endpoints intended for RF association with a network of RF transceivers, such methodology comprising:
   using an installation testing device for initiating transmission of a validation message from a data endpoint intended for RF association with said network of RF transceivers;
   directly receiving at said installation testing device any reply messages originating from such RF transceivers, said reply messages including reply message data and originating from such RF transceivers in response to said validation message transmitted by said data endpoint intended for RF association; and
   offsetting said reply message data to compensate for differences in RF characteristics associated with said network of RE transceivers.

13. Methodology as in claim 12, wherein said receiving includes receiving any reply messages directly from such RF transceivers and indirectly from a data endpoint having received such reply messages directly from such RF transceivers and retransmitting same.

14. Methodology as in claim 12, wherein:
   said RE transceivers comprise a plurality of cell control units and repeaters, each of which has RF transceiver functionality;
   said initiating includes initiating transmission of a validation message from a mobile device provided for transmission of validation messages;
   said reply messages comprise a randomly timed transmission which includes said reply message data identifying the transmitting RF transceiver and indicating the relative strength of the signal of the validation message received by such RF transceiver; and
   said methodology further includes using GPS functionality and logging the location of said mobile device upon receipt of any reply messages thereat from said network of RF transceivers while moving such mobile device around in such network, and correlating such reply messages and logged locations, for mapping the wireless communication operability for such network.

15. Methodology as in claim 12, further including using a mobile, handheld device field-usable by an installer for said initiating step, for real time checking of communication operability of an installed endpoint.

16. Methodology as in claim 12, further including:
   initiating said validation message transmission a plurality of times at intervals; and
   wherein said RE transceivers trans reply messages on randomly selected communications channels.

17. Methodology as in claim 12, wherein:
   said validation message includes data for requesting response from any receiving RF transceiver of said network; and
   each of said RE transceivers transmits a plurality of reply messages at randomly selected times after a predetermined minimum amount of delay after receipt of said validation message.

18. Methodology as in claim 12, further including:
   newly installing a data endpoint for RF association with an existing network of RE transceivers; and
   validating wireless communication operability for such newly installed data endpoint by transmitting a validation message from such newly installed data endpoint, listening with such newly installed data endpoint for any reply messages from said RF transceivers, retransmitting reply message related data from such newly installed data endpoint to a receiver, and assessing said retransmitted reply message related data in order to validate wireless communication operability for such newly installed data endpoint.

19. Methodology as in claim 12, wherein:
   said reply messages include data identifying the transmitting RF transceiver and indicating the relative strength of the signal of the validation message received by such RF transceiver; and
   said methodology further includes assessing reply message data to respectively determine the quality of wire communication operability coverage at the locations of selected of said plurality of data endpoints.

20. Methodology as in claim 12, wherein:
   said network of RF transceivers comprises a plurality of RF transceivers respectively belonging to a plurality of device families; and
   said differences in RF characteristics associated with said network of RF transceivers comprise differences in RF characteristics associated with said plurality of device families.

21. Methodology as in claim 19, comprising assessing reply message data to respectively determine whether a dual coverage requirement is met at the locations of selected of said plurality of data endpoints.

* * * * *

UNITED STATES PATENT AND TRADEMARK OFFICE
CERTIFICATE OF CORRECTION

PATENT NO. : 8,781,462 B2  
APPLICATION NO. : 12/888752  
DATED : July 15, 2014  
INVENTOR(S) : Osterloh et al.

Page 1 of 1

It is certified that error appears in the above-identified patent and that said Letters Patent is hereby corrected as shown below:

In the Claims

Column 8, line 35 Claim 3, please delete "RE" and replace with --RF-- and in line 37, likewise delete "RE" and replace with --RF--.

Column 9, line 8 Claim 9, please delete "RE" and replace with --RF--.

Column 9, line 17 Claim 11, please delete "RE" and replace with --RF--.

Column 9, line 37 Claim 12, please delete "RE" and replace with --RF--.

Column 9, line 44 Claim 14, please delete "RE" and replace with --RF--.

Column 10, line 12 Claim 16, please delete "RE transceivers trans reply messages" and replace with --RF transceivers transmit rep messages--.

Column 10, line 18 Claim 17, please delete "RE" and replace with --RF--.

Column 10, line 24 Claim 18, please delete "RE" and replace with --RF--.

Signed and Sealed this  
Fourth Day of November, 2014

Michelle K. Lee  
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,781,462 B2 |
| APPLICATION NO. | : 12/888752 |
| DATED | : July 15, 2014 |
| INVENTOR(S) | : Osterloh et al. |

It is certified that error appears in the above-identified patent and that said Letters Patent is hereby corrected as shown below:

In the Claims

Column 8, line 35 Claim 3, please delete "RE" and replace with --RF-- and in line 37, likewise delete "RE" and replace with --RF--.

Column 9, line 8 Claim 9, please delete "RE" and replace with --RF--.

Column 9, line 17 Claim 11, please delete "RE" and replace with --RF--.

Column 9, line 37 Claim 12, please delete "RE" and replace with --RF--.

Column 9, line 44 Claim 14, please delete "RE" and replace with --RF--.

Column 10, line 12 Claim 16, please delete "RE transceivers trans reply messages" and replace with --RF transceivers transmit reply messages--.

Column 10, line 18 Claim 17, please delete "RE" and replace with --RF--.

Column 10, line 24 Claim 18, please delete "RE" and replace with --RF--.

This certificate supersedes the Certificate of Correction issued November 4, 2014.

Signed and Sealed this
Seventeenth Day of February, 2015

Michelle K. Lee
*Deputy Director of the United States Patent and Trademark Office*